May 10, 1927.
F. W. SCARFF
1,628,068
GUN MOUNTING FOR USE ON AIRCRAFT
Filed Nov. 7, 1924 2 Sheets-Sheet 1
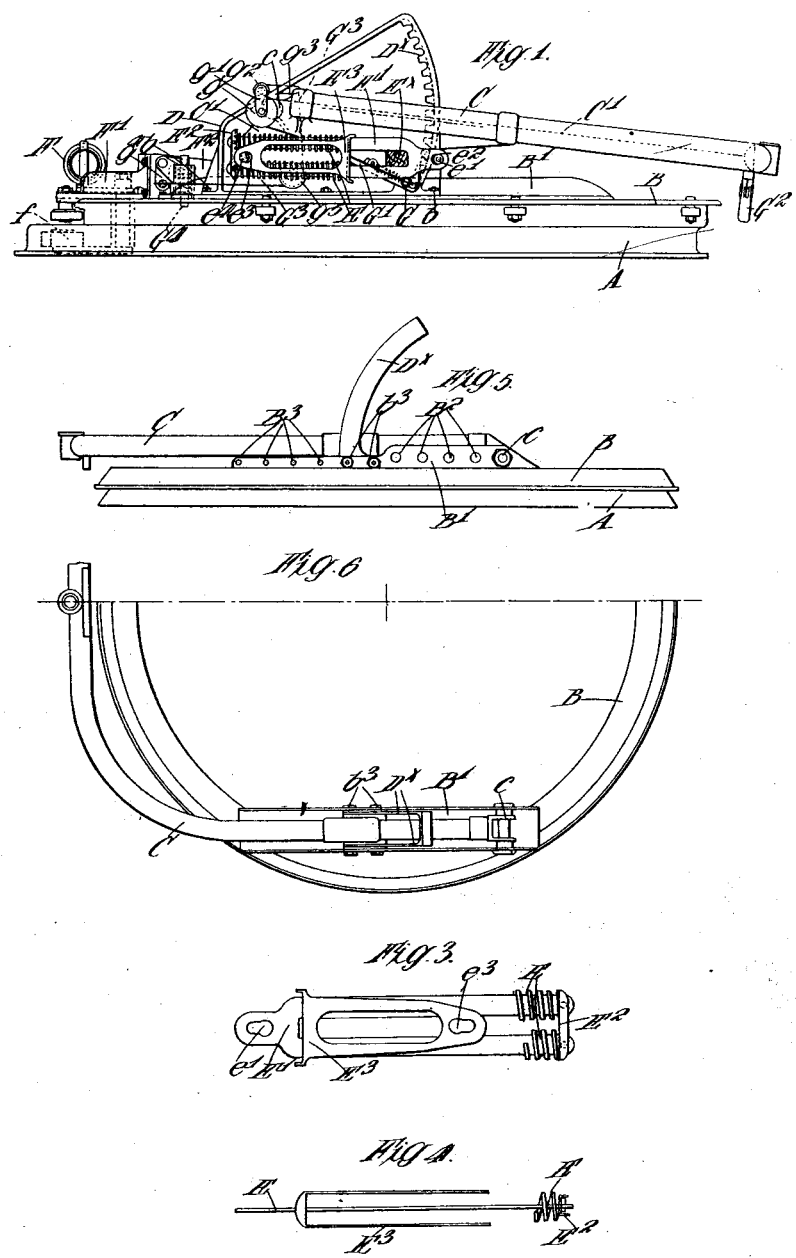

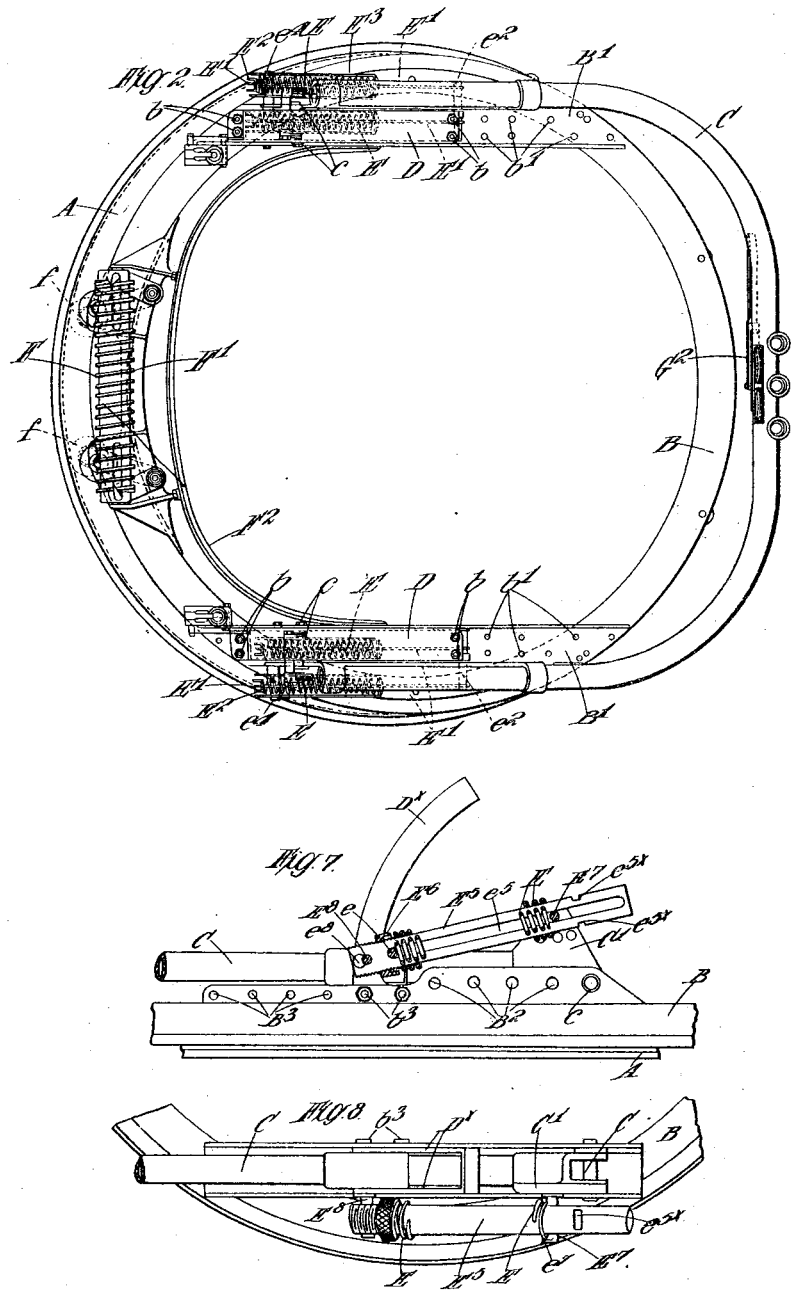

Patented May 10, 1927.

1,628,068

UNITED STATES PATENT OFFICE.

FREDERICK WILLIAM SCARFF, OF LONDON COUNTY, ENGLAND, ASSIGNOR TO VICKERS LIMITED, OF LONDON, ENGLAND, A BRITISH COMPANY.

GUN MOUNTING FOR USE ON AIRCRAFT.

Application filed November 7, 1924, Serial No. 748,375, and in Great Britain November 27, 1923.

This invention relates to gun mountings of the ring type for use on aircraft (particularly aeroplanes) this type of mounting comprising a ring or ring-like member which is supported for training movements upon a fixed ring or equivalent guide member and to which is trunnioned an elevating arm (preferably of U shape in plan view) carrying the gun or guns. Aeroplanes are now being constructed with fuselages or cock-pits of substantially greater width than the diameter of the rings of existing or standard mountings with the result that when such a mounting is employed on an aeroplane having the wider fuselage or cock-pit, the "over-the-side" or downward fire of the gun or guns is restricted by the sides of the fuselage.

According to the principal feature of the present invention, in order to avoid the above-mentioned disadvantage, the mounting is so constructed that the elevating arm itself, or the brackets in which the elevating arm is trunnioned, can be adjusted with respect to the rotatable ring of the mounting so that the distance between the axis of the ring and the free end of the elevating arm where the gun or guns are supported can be altered in accordance with the width of the fuselage or cock-pit, and in this manner the same degree of "over-the-side" fire can be obtained as would be the case with a mounting of larger diameter. The elevating arcs or quadrants have inner side plates and outwardly extending flanges the rear surfaces of which are formed with teeth with which locking devices for the elevating arm co-operate, so that there is no danger of the gunner being injured by being thrown against the said teeth by reason of violent and unexpected movements of the aeroplane.

Another feature of the invention relates to the springs employed for balancing the elevating arm against the weight of the gun or guns carried thereby and consists in providing two balancing springs (or two sets of balancing springs) between the rotatable ring (or parts carried thereby) and extensions on the elevating arm, and in providing means whereby one spring at each side (or one set of springs at each side) can readily be removed when only one gun is to be carried by the elevating arm and can readily be replaced when two or more guns are to be carried.

The wind balancing gear for the rotatable ring is generally similar to that forming the subject of United States Patent 1,500,726 and another feature of the present invention is the connection of the bracket carrying the spring and rollers of such gear to a back-rest for the gunner, which back-rest is in turn connected to the rotatable ring (or parts carried thereby) at points which are approximately diametrically opposite one another. In this manner the stresses caused by the couple exerted by the spring are distributed over the rings instead of being localized.

The elevating and training locking devices are preferably operated by means of a handle and wires in such a manner that the locking devices are released in succession, the rotatable ring being released before the elevating arm. In the specification of United States Patent No. 1,364,525 several constructional arrangements of such locking devices are disclosed and another feature of the present invention consists in a modified construction in which a wire passes over pulleys carried by pivoted arms connected by wires to the training locking device, so that when a pull is exerted on the handle in order to release the training locking device, the arms will swing into a position in which the axes of the pulleys are opposite the axes of the trunnions of the elevating arm. Thus when the locking devices of the elevating arm are released by a further pull on the said handle, the elevating movements of the elevating arm can take place without such movements affecting the tension of the wire and the position of the locking devices.

In order that the said invention may be clearly understood and readily carried into effect, the same will now be described more fully with reference to the accompanying drawings, in which:—

Figure 1 is a side elevation shewing a mounting provided with constructional forms of the different features of this invention.

Figure 2 is a plan of Figure 1.

Figures 3 and 4 are respectively a side elevation and a plan shewing on a larger scale and in reverse view the balancing springs of Figure 1 and their associated parts.

Figures 5 and 6 are diagrammatic views shewing in side elevation and in half plan a form of mounting in which the elevating arm is made adjustable upon the brackets in which this arm is trunnioned.

Figures 7 and 8 are respectively a side elevation and a part plan of a modified form of balancing springs and associated parts as applied to the mounting shewn in Figures 5 and 6.

A is the fixed ring, B is the rotatable ring mounted on the fixed ring, C is the U-shaped elevating arm and $c$, $c$ are its trunnions.

Referring to Figures 1 and 2 the rotatable ring B has two chordal plates $B^1$, $B^1$ riveted to its upper part and provided with a number of holes $b^1$, $b^1$— at different points along their length. Brackets D, D in which the trunnions $c$, $c$ are pivoted rest on these chordal plates and have feet or flanges formed with holes to receive bolts $b$, $b$— which also pass through the holes $b^1$, $b^1$. Thus after removing the said bolts and adjusting the brackets into the desired position, the bolts can be passed through other holes in the chordal plates and the brackets thereby held in their new positions. It will be understood that it is not intended that such adjustments shall be effected during flight but are to be permanent in so far as any particular aeroplane is concerned.

E, E are helical compression springs for balancing the elevating arm C against the weight of the guns carried thereby. In the construction shewn in Figures 1 to 4 there are two pairs of springs at each side of the mounting, the springs in each pair being arranged one above the other. The outer pair of springs are made readily detachable as aforesaid and for this purpose they are arranged around the rearwardly extending forked pieces of a member $E^1$ having at its forward part a key-hole slot $e^1$ the smaller portion of which engages in a circumferential groove in a pivot pin $e^2$ on the elevating bracket D. The rear ends of the springs bear against a stop piece $E^2$ serving to connect the rear ends of the aforesaid forked pieces together and the front ends of the said springs bear against a member $E^3$ which is slidably mounted on the said forked pieces. This sliding member has forked pieces formed near their rear ends with key-hole slots $e^3$ the narrower portions of which engage in circumferential grooves in a pin $e^4$ projecting outwardly from an extension $C^1$ of the elevating arm C. The springs normally hold the narrower portions of the various key-hole slots in engagement with the grooves in the two pins, but by suitable manipulation the wider portions of the said slots can be caused to register with the pins and the unit composed of the two outer springs, the member $E^1$ and the member $E^3$ can be removed laterally. This manipulation preferably consists in placing a block of wood or other suitable material in the space between the forward parts of the forked pieces of the member $E^1$ (this block being indicated at $E^x$ in Figure 1) and in elevating the arm C slightly beyond the point at which the block $E^x$ arrests the forward movement of the member $E^3$. This brings the pin $e^4$ opposite the wider portion of the slots $e^3$ and by continuing the elevating movement of the arm C the member $E^1$ is pushed forward to bring the wider portion of the slot $e^1$ opposite the pin $e^2$. The members $E^1$ and $E^3$ can then be detached by a lateral movement. To replace the spring unit, the reverse operations are performed.

F (Figures 1 and 2) represents the spring of the wind balancing gear which, as aforesaid, is generally similar to that forming the subject of British Patent No. 204070; the bracket $F^1$ carrying the said spring and the rollers $f$ of this gear, is connected to a curved back-rest $F^2$ for the gunner as well as directly to the rotatable ring B. This back-rest is connected at points nearly diametrically opposite one another (by riveting for example) to the plates $B^1$, $B^1$ so that the stresses caused by the couple exerted by the spring F are distributed over the rings A and B instead of being localized as is the case when the bracket $F^1$ is only connected directly to the rotatable ring B.

G (Figure 1) is one of the two elevating locking bolts arranged on opposite sides of the mounting for engaging with teeth which are formed on the rear surfaces of outwardly extending flanges $D^x$ on the aforesaid brackets D. These brackets have inner side walls and the teeth are therefore shrouded so that the gunner is protected from injury by the said teeth in the event of his being thrown sideways. The said locking bolts are carried by the aforesaid extensions $C^1$ of the elevating arm C and are spring-controlled. Each of the said locking bolts is connected by a wire $G^1$ to an operating handle $G^2$ on the transverse portion of the arm C, this wire passing over a pulley $g$ carried by an arm $g^1$ which is pivoted at $g^2$ to the bracket D. The arm $g^1$ is connected to an arm $g^3$ to which is attached a wire $G^3$ leading to a lever $g^4$ for operating the spring-controlled training locking bolt, $G^4$, this wire passing under a pulley $g^5$ carried by the bracket D. The parts are so arranged that in the normal position (i. e. the position in which the locking bolts G and $G^4$ are in their engaging positions) the pulleys $g$ are situated with their axes eccentric with respect to the axes of the elevating trunnions c as shown in Figure 1. When the handle G² is operated to release the locking bolts, the pull on the wire G¹ first moves the arms $g^1$, $g^3$ to lift the training locking bolts G⁴ by means of the wires G³ (the elevating locking bolts G being meanwhile held in their engaging postition by their springs the strength of which is suitably chosen accordingly) and this movement of the said arms brings the axes of the pulleys g into line with the axes of the elevating trunnions c. The training locking bolts having by this time reached the limit of their movement, the continued pull on the wire G¹ then moves the elevating locking bolts G to their liberating position and this position is not affected by the subsequent elevating movements of the elevating arm, owing to the concentric position of the pulleys g with respect to the elevating trunnions.

In the construction according to Figures 5 and 6 the elevating arm C is trunnioned directly to the chordal plates B¹, B¹ which are made of channel shape with the side walls formed with holes B² at different points along their length to receive the elevating trunnion pins c. The elevating arm can thus be adjusted to vary the distance between the free end of the elevating arm and the axis of the rotatable ring B, by engaging the detachable trunnions c with the required holes. The elevating arcs D˟ are also made correspondingly adjustable by the provision of holes B³ in the side walls of the plates B¹ for the reception of removable bolts $b^3$ passing through the base of each elevating arc.

Figures 7 and 8 illustrate a modified form of the removable springs E for balancing the elevating arm C against the weight of the guns. In this form, which is shewn by way of example as applied to the construction of mounting according to Figures 5 and 6, there are two springs at each side of the gun mounting one arranged inside and the other outside a cylinder E⁵ having a longitudinal slot $e^5$. Passing through the front end of this slot is a pin $e^6$ the outer end of which bear against the recessed portion of a collar E⁶ which engages with screw threads on the front part of the cylinder. The front ends of the inner spring bears against the pin $e^6$ and the front end of the outer spring bears against the collar E⁶. The rear ends of the said springs bear against a pin E⁷ which is carried by an extension C¹ on the elevating arm C, the cylinder being held in position laterally at this point by the engagement of a projection $e^7$ on the pin E⁷ with the rear end of the outer spring as shewn in Figure 8. The front part of the cylinder E⁵ is formed with a key-hole slot $e^8$ in the narrow portion of which engages a pin E⁸ projecting laterally from the elevating arc D˟. The enlarged head of the pin E⁸ normally prevents the front end of the cylinder E⁵ from being withdrawn laterally. To remove one of the springs when required, a stirrup-piece is inserted in slots $e^{5x}$, $e^{5x}$ formed in the rear part of the cylinder and the arm C is elevated past the position at which the rear ends of the springs bear against this stirrup-piece so as to bring the projection $e^7$ clear of the rear end of the outer spring. The cylinder is then free to be moved forwardly until the wide portion of the key-hole slot $e^8$ comes opposite the head of the pin E⁸ and the cylinder E⁵ with the springs held in position thereon by the stirrup-piece can then be removed laterally. The outer spring or the inner spring can then be removed from the cylinder and the latter then replaced with only the remaining spring in position. The position of the aforesaid pin E⁷ can be varied as required by passing it through any one of several holes (shewn in Figure 1) in the extension C¹. The pin E⁷ can be located at any point on a circle having the trunnion axis as the centre and the pin E⁸ can also be arranged at any desired position on the elevating arc D˟, or alternatively the latter pin, with a suitable position of the pin E⁷, can be used to pivotally connect the end of the cylinder E⁵ remote from the collar E⁶ and the pin $e^6$ or their equivalents, to the rotatable ring or a part carried thereby. In any of these arrangements the two springs apertaining to each cylinder may both be arranged inside the cylinder or both around the cylinder, instead of one inside and one around as above described.

What I claim and desire to secure by Letters Patent of the United States is:—

1. In a gun mounting of the ring type for use on aircraft, the combination with the rotatable ring and the elevating arm carrying one or more guns, of means whereby the distance between the axis of said ring and the free end of said elevating arm where the gun or guns are supported, can be altered.

2. In a gun mounting of the ring type for use on aircraft, the combination with the rotatable ring and the elevating arm carrying one or more guns, of brackets in which said elevating arm is trunnioned and means for adjusting said brackets upon said ring so as to alter the distance between the axis of the ring and the free end of said elevating arm where the gun or guns are supported.

3. In a gun mounting of the ring type for use on aircraft, the combination with the rotatable ring and the elevating arm carrying one or more guns, of brackets in which said elevating arm is trunnioned, chordal members on said ring and bolts passing through the brackets and through selected holes of a number of holes formed at different points along the length of said chordal members.

4. In a gun mounting of the ring type for use on aircraft, the combination with the rotatable ring and the elevating arm carrying one or more guns, of chordal members on said ring, said members being formed with holes at different points along their length, elevating arcs, bolts passing through said arcs and through selected holes in said members, and removable trunnions for said arm passing through other selected holes in said members.

5. In a gun mounting of the ring type for use on aircraft, the combination with the rotatable ring, the elevating arm carrying one or more guns, and the elevating arcs, of inner side plates on said arcs, outwardly extending flanges on said arcs, teeth on the rear surfaces of said flanges and locking devices on said elevating arm for co-operating with said teeth.

6. In a gun mounting of the ring type for use on aircraft, the combination with the elements claimed in claim 2, of inner side plates forming part of the brackets, arcuate flanges extending outwardly from said brackets, teeth on the rear surfaces of said flanges and locking devices on said elevating arm for co-operating with said teeth.

7. In a gun mounting of the ring type for use on aircraft, the combination with the rotatable ring and the elevating arm, of a plurality of metallic springs of the helical compression type for balancing the elevating arm against the weight of the guns carried by said arm and means whereby certain of said springs can readily be removed when only one gun is to be carried by said arm and can readily be replaced when more than one gun is to be carried.

8. In a gun mounting of the ring type for use on aircraft, the combination with the rotatable ring and the elevating arm, of extensions on said elevating arm, two springs at each side of the mounting between said extensions and parts carried by the ring, said springs serving to balance the elevating arm against the weight of the guns carried by said arm, and means whereby one spring on each side can readily be removed when only one gun is to be carried by said arm and can readily be replaced when more than one gun is to be carried.

9. In a gun mounting of the ring type for use on aircraft, the combination with the elements claimed in claim 3, of a spring and roller wind balancing gear, a bracket carrying the spring and rollers of said gear, a gunner's back-rest rigidly secured to said bracket and also rigidly secured to the chordal members at points which are more or less diametrically opposite one another.

10. In a gun mounting of the ring type for use on aircraft, the combination with the rotatable ring, the elevating arm carrying one or more guns, an elevating locking device for said arm, a training locking device for said ring, wires for operating said devices and a handle for exerting a pull on said wires, of a pivoted arm connected by one of the wires to the training locking device and a pulley on said arm around which pulley passes another wire connected to the elevating locking device, said arm and pulley being so arranged that when the handle is operated in order to release the training locking device, said arm will swing into a position in which the axis of the pulley is in line with the trunnion axis of the elevating arm.

11. In a gun mounting of the ring type, the combination with the elements claimed in claim 2, of elevating locking devices for said arm, training locking devices for said ring, wires for operating said devices and a handle for exerting a pull on said wires, arms pivoted to the brackets and connected by some of the wires to the training locking devices, and a pulley on each of said arms, one of the wires passing around each pulley to each of the elevating locking devices, said arms and pulleys being so arranged that when the handle is operated in order to release the training locking devices, said arms will swing into a position in which the axes of the pulleys are in line with the trunnion axis of the elevating arm.

FREDERICK WILLIAM SCARFF.